United States Patent
Auber

(10) Patent No.: US 6,267,382 B1
(45) Date of Patent: Jul. 31, 2001

(54) FAIL SAFE L-SHAPED SPRING CARRIER FOR GAS SEALS

(75) Inventor: Philippe Jacques Auber, Le Havre (FR)

(73) Assignee: Dresser-Rand Company, The Woodlands, TX (US)

( * ) Notice: Subject to any disclaimer, the term of this patent is extended or adjusted under 35 U.S.C. 154(b) by 0 days.

(21) Appl. No.: 09/441,560

(22) Filed: Nov. 17, 1999

Related U.S. Application Data

(63) Continuation of application No. 08/945,196, filed on Feb. 23, 1998.

(51) Int. Cl.$^7$ .................................................. F16J 15/38
(52) U.S. Cl. ................................................ 277/390; 277/396
(58) Field of Search ................................... 277/370, 377, 277/390, 379, 371, 375, 396, 400, 591

(56) References Cited

U.S. PATENT DOCUMENTS

| | | |
|---|---|---|
| 3,479,040 | 11/1969 | Tracy . |
| 3,540,742 | 11/1970 | Tracy . |
| 3,970,320 | 7/1976 | Wiese . |
| 3,972,536 | 8/1976 | Warner et al. . |
| 4,095,803 | 6/1978 | Meier et al. . |
| 4,127,275 | 11/1978 | Champlin . |
| 4,212,475 * | 7/1980 | Sedy ..................................... 277/96 |
| 4,213,618 | 7/1980 | Thurber . |
| 4,253,713 | 3/1981 | Chambers, Sr. . |
| 4,290,611 * | 9/1981 | Sedy ..................................... 277/27 |
| 4,389,051 | 6/1983 | Mullaney . |
| 4,434,986 | 3/1984 | Warner . |
| 4,625,977 | 12/1986 | Azibert et al. . |
| 4,786,061 | 11/1988 | Buchalla . |
| 4,889,348 * | 12/1989 | Amundson et al. .................... 277/63 |
| 4,989,882 | 2/1991 | Warner et al. . |
| 5,039,115 | 8/1991 | Hebert et al. . |
| 5,058,905 | 10/1991 | Nosowicz et al. . |
| 5,116,066 | 5/1992 | Crawford . |
| 5,275,421 | 1/1994 | Hornsby . |
| 5,443,274 * | 8/1995 | Fuse ...................................... 277/38 |
| 5,451,065 * | 9/1995 | Holder .................................. 277/27 |
| 5,454,572 * | 10/1995 | Pospisil ................................ 277/65 |
| 5,496,047 * | 3/1996 | Goldswain et al. ................... 277/96 |
| 5,558,342 * | 9/1996 | Sedy ................................... 277/136 |
| 5,560,622 * | 10/1996 | Sedy ..................................... 277/85 |

FOREIGN PATENT DOCUMENTS

| | | |
|---|---|---|
| 92 12 923 U | 11/1992 | (DE) . |
| 295 05 251 U | 5/1995 | (DE) . |
| 0177161 | 9/1985 | (EP) . |
| 1105773 | 3/1968 | (GB) . |
| 1334507 | 10/1973 | (GB) . |
| 215467A | 9/1985 | (GB) . |
| WO9213216 | 8/1992 | (WO) . |

\* cited by examiner

Primary Examiner—Anthony Knight
Assistant Examiner—Vishal Patel
(74) Attorney, Agent, or Firm—Haynes and Boone LLP

(57) ABSTRACT

The present invention relates to a shaft seal (1) comprising a sealing element (14) mounted co-axially to a rotary sealing ring (10) to form a primary seal between opposed faces thereof to substantially prevent fluid flow across the primary seal. The sealing element (14) is urged axially towards the rotary ring (10) by a springs (15) acting between a pusher sleeve (17) connected to the sealing element 14 and a seal housing (19). A secondary seal formed between the pusher sleeve (17) and the housing (19) by a sealing member (20) located in a channel (21) in the pusher sleeve (17).

3 Claims, 3 Drawing Sheets

FAIL SAFE L-SHAPED SPRING CARRIER FOR GAS SEALS

Figure 1A:
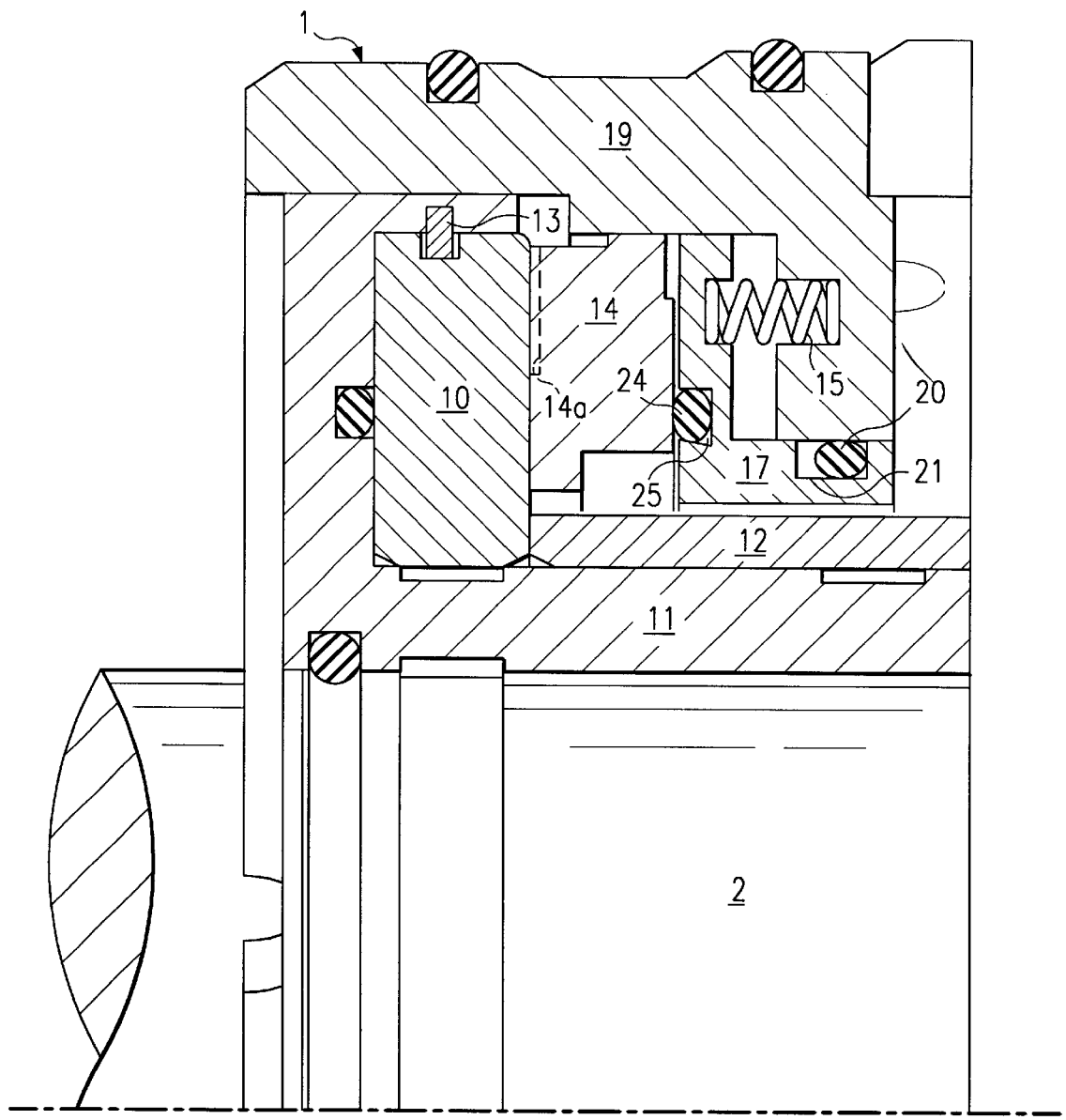

This is a divisional application of U.S. Ser. No. 08/945,196 filed Feb. 23, 1998.

The invention relates to a shaft seal for rotating shafts in turbo-machines, in particular but not exclusively to non-contacting shaft seals.

This type of shaft seal is often used with machinery for the pumping of gas (nitrogen, argon, hydrogen, natural gas, air, etc.) where the transmission of gas along the shaft needs to be prevented. Due to the high-pressure, high-speed machinery which is normally used, the shaft seals may be non-contact type seals, in order to reduce heat build up in the seals and the wear of the sealing parts.

Non-contacting operation avoids this undesirable face contact when the shaft is rotating above a certain minimum speed, which is often called a lift-off speed.

Non-contacting shaft seals provide advantages over seals where the sealing surfaces contact one another due to reduction in wear and the lower heat generation. Articles entitled "Fundamentals of Spiral Groove Non-contacting Face Seals" by Gabriel, Ralph P. (Journal of American Society of Lubrication Engineers Volume 35, 7, pages 367–375, and "Improved Performance of Film-Riding Gas Seals Through Enhancement of Hydrodynamic Effects" by Sedy, Joseph (Transactions of the American Society of Lubrication Engineers, Volume 23, 1 pages 35–44) describe non-contacting contacting seal technology and design criteria and are incorporated herein by reference.

As with ordinary mechanical seals, a non-contacting face seal consists of two sealing rings, each of which is provided with a very precisely finished sealing surface.

These surfaces are tapered-shape perpendicular to and concentric with the axis of rotation. Both rings are positioned adjacent to each other with the sealing surfaces in contact at conditions of zero pressure differential and zero speed of rotation. One of the rings is normally fixed to the rotatable shaft by means of a shaft sleeve, the other located within the seal housing structure and allowed to move axially. To enable axial movement of the sealing ring and yet prevent leakage of the sealed fluid, a sealing member is placed between the ring and the housing. This sealing member must permit some sliding motion while under pressure, therefore normally a top quality O-ring is selected for that duty. This O-ring is often called the secondary seal.

As mentioned above, to achieve non-contacting operation of the seal, one of the two sealing surfaces in contact is provided with shallow surface recesses, which act to generate pressure fields that force two sealing surfaces apart. When the magnitude of the forces resulting from these pressure fields is large enough to overcome the forces that urge seal faces closed, the sealing surfaces will separate and form a clearance, resulting in non-contacting operation. As explained in detail in the above-referenced articles, the character of the separation forces is such that their magnitude decreases with the increase of face separation. Opposing or closing forces, on the other hand, depend on sealed pressure level and as such are independent of face separation. They result from the sealed pressure and the spring force acting on the back surface of the axially movable sealing ring. Since the separation or opening force depends on the separation distance between sealing surfaces, during the operation of the seal or on imposition of sufficient pressure differential equilibrium separation between both surfaces will establish itself. This occurs when closing and opening forces are in equilibrium and equal to each other. Equilibrium separation constantly changes within the range of gaps. The goal is to have the low limit of this range above zero. Another goal is to make this range as narrow as possible, because on its high end the separation between the faces will lead to increased seal leakage. Since non-contacting seals operate by definition with a clearance between sealing surfaces, their leakage will be higher then that of a contacting seal of similar geometry. Yet, the absence of contact will mean zero wear on the sealing surfaces and therefore a relatively low amount of heat generated between them. It is this low generated heat and lack of wear that enables the application of non-contacting seals to high-speed turbomachinery, where the sealed fluid is gas. Turbocompressors are used to compress this fluid and since gas has a relatively low mass, they normally operate at very high speeds and with a number of compression stages in series.

As explained in the above-referenced articles, the effectiveness of the seal is largely dependent upon the so-called balance diameter of the seal. This is also true for contact seals.

The pressure developed in the clearance, or gap, is balanced against the pressure existing against the back side of the fixed seal element. The closing forces, including a spring force and regions exposed to high and low (atmospheric) pressure, act to counter the opening force that creates the gap. An O-ring, commonly termed the secondary seal, divides the area at the back of the seal element into the regions of high pressure and low pressure. The O-ring slides backwards and forwards relative to the seal element, thus changing the relative size of the regions of pressure.

The diameter of the cylinder upon which the O-ring is sliding is the balance diameter. When the O-ring is placed at a radial distance (of the cylinder) equivalent to where equilibrium separation in the gap occurs, that is, where closing forces balance with opening forces, the placement may be described as the equilibrium balance diameter.

When pressure is applied from the outside diameter of the seal, reduction of the balance diameter results in a greater force pushing the two sealing faces together and so a smaller gap between the faces. Thus, less gas is leaked from the system.

During a typical period of operation, a turbocompressor is started and the power unit starts the shaft rotating. At the initial warm-up stage of operation, shaft speeds may be quite low. Typically, oil is used to support the shaft at its two radial bearings and one thrust bearing. Oil warms up in oil pumps and also accepts shear heat from compressor bearings. The oil together with process fluid turbulence and compression in turn warm-up the compressor. Once the full operating speed is reached, the compressor reaches in time some elevated equilibrium temperature. On shutdown, shaft rotation stops and the compressor begins to cool down. In this situation, various components of the compressor cool down at different rates and, importantly, the shaft contracts with decreasing temperature at a different rate than the compressor casing. These prior art secondary seal arrangements can be found for example in U.S. Pat. Nos. 4,768,790; 5,058,905 or 5,071,141. The term used often in the industry for this phenomenon is "seal face hang-up". Often there is a very high leakage of process fluid the next time the compressor is restarted and often in such cases the seal will resist all attempts to reseal it. The seal must then be removed and replaced at a considerable cost in time and lost production.

U.S. Pat. No. 5,370,403 and EP-A-0,519,586 describe methods of reducing seal face hang up by attempting to prevent movement of the secondary seal.

The present invention seeks to provide a shaft seal with improved sealing characteristics in dynamically transient operation of the seal, as well as during pressurisation/depressurisation and stand-still conditions.

According to the present invention there is provided a shaft seal comprising a sealing element mounted co-axially to a rotary sealing ring to form a primary seal between opposed faces thereof to substantially prevent fluid flow across the primary seal from a high-pressure radial side to a low-pressure radial side, the sealing element being urged axially towards the rotary ring by a biasing means acting between a pusher sleeve connected to the sealing element and a seal housing with a secondary seal formed therebetween by a sealing member located in a channel in the part on the low-pressure radial side.

By providing the secondary sealing member in the part radially distant from the high pressure source, the primary seal quickly provides an effective barrier. Further, during start-up of the seal, the problem of seal face hang-up is greatly reduced or even eliminated. The inventor considers that the improvements due when the secondary sealing member slides axially during start-up of the machine, the frictional engagement of the seal member with the pusher sleeve and housing surfaces, alters the balance diameter of the shaft seal to where the frictional engagement occurs. Consequently, due to the sealing member being located in the low pressure side, the balance diameter is altered towards providing increasing the closing force in the primary seal. Normally, the friction between the housing and pusher sleeve would be aligned along the equilibrium balance diameter of the shaft seal.

This invention is particularly applicable to non-contact seals.

Preferably, the pusher sleeve is a L-shaped part separate from the sealing element. The spring (biasing means) acts between the housing and one leg of the L-shaped sleeve parallel to the back face of the sealing element. The secondary sealing is formed between a face of the housing and the other leg of the L-shaped sleeve. Preferably the other leg of the sleeve is radially inward of the housing.

Advantageously, a further seal is provided by an O-ring between the pusher sleeve and the sealing element, wherein the further seal O-ring is located in a half dovetail channel. Normally, the further O-ring is provided between the pusher sleeve and the sealing element in a square cut or dovetail channel provided in the sleeve. The dove-tailed channel is often used so that the O-ring can be reliably installed in the seal. However, during shutdown of the seal, the seal is often blown out of the channel due to pressure build up in the dove-tailed channel which cannot otherwise be vented. The preferred half dove-tailed shape allows a limited movement of the O-ring allowing pressure to escape from the channel. Due to the very high cost associated with the seal strip down, this design is particularly advantageous.

Figure 1B:
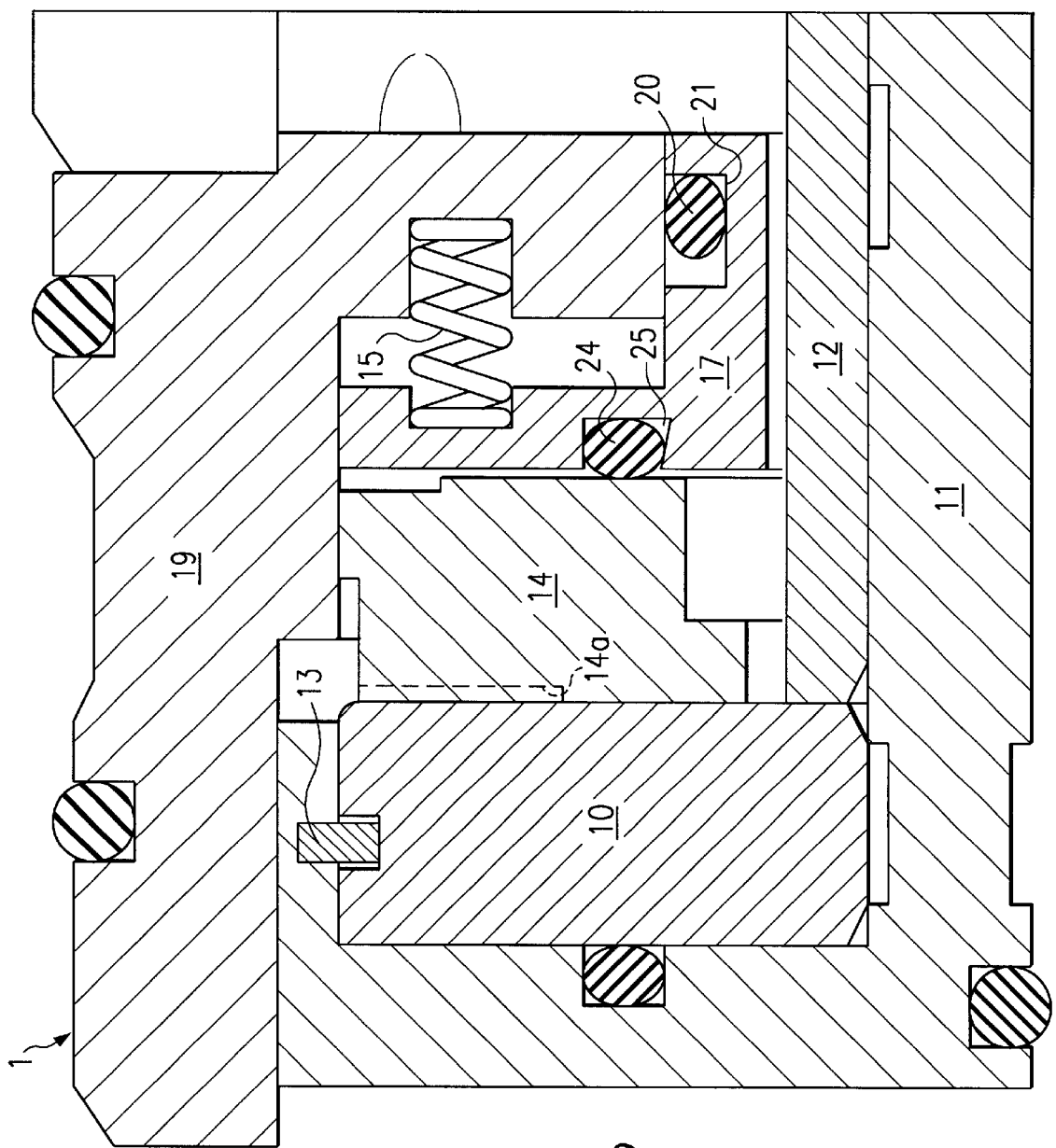

Preferred embodiments of the present invention will now be described with reference to the drawings in which:

FIG. 1*a* shows a cross-sectional view of the top half of non-contact seal according to the present invention;

FIG. 1*b* shows an enlarged view of the embodiment of FIG. 1*a*.

Figure 2:
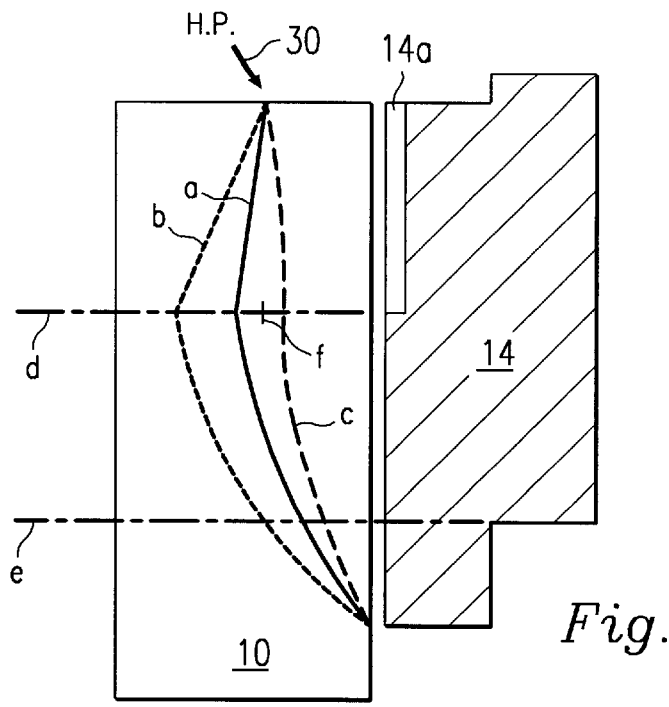
Figure 3A:
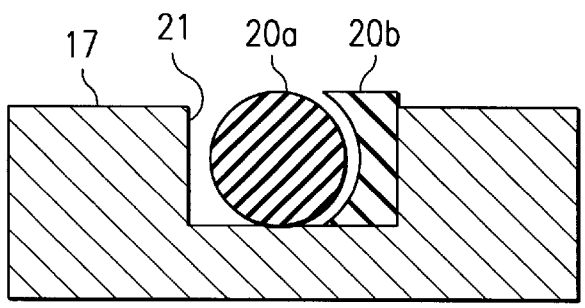
Figure 3B:
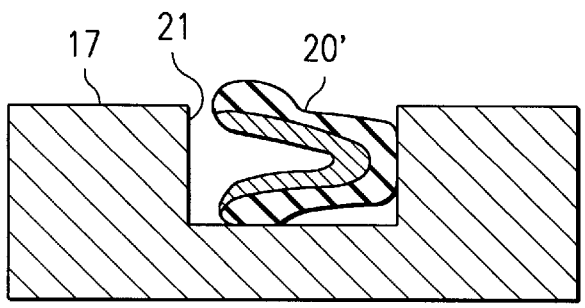

FIG. 2 shows a schematic representation of the primary seal of the present invention with a pressure profile overlaid;

FIG. 3*a* shows a first alternative secondary seal arrangement;

FIG. 3*b* shows a second alternative secondary seal arrangement.

The invention provides a shaft seal 1 about a shaft 2. Normally, two shaft seals (not shown) are provided in tandem along the second (downstream) seal forming a backup to the first seal on a shaft of a compressor, turbine or other pressurised machine.

The seal 1 includes a rotary sealing ring 10 mounted about the shaft 2 radially outwards of an inner sleeve 11 mounted about the shaft 2.

The inner sleeve 11 is coupled for rotation and axial locking with the shaft 2 and the sealing ring 10 is coupled for rotation to the inner sleeve 11 by means of dowels 13 extending into the outside radial edge of the sealing ring 10. The inner sleeve 11 includes a radial flange which prevents axial movement of the sealing ring 10 in one direction. The dowels 13 are fitted to an axially extending shroud portion of the inner sleeve 11 protruding from the radial outside edge of the radial hinge. Other normal arrangements such as pins into the back face of the sealing ring 10 could also be employed. A second sleeve 12 is provided to prevent axial movement of the sealing ring 10 in the other axial direction.

A rotationally stationary sealing element 14 is mounted juxtaposed to the sealing ring 10. A primary seal is formed between radially extending sealing faces of the sealing ring 10 and the sealing element 14 opposed to one another. The sealing face of the sealing element 14 having shallow grooves 14*a* cut into the front surface thereof to generate the required separation between the sealing faces. Of course the grooves could alternatively be formed in the rotary sealing ring 10.

Preferred designs of the grooves are given in more detail in our co-pending application no. to U.S. Ser. No. 08/836,689, filed May 16, 1997, pages 10–15 and the preferred designs of the groove are incorporated herein by reference. The sealing element 14 is normally made from carbon or other suitable material.

The sealing element 14 is biased axially towards the sealing ring 10 by spring means 15 (shown partly in dotted outline. The sealing element 14 has a limited axial movement. Spring means 15 normally comprises a plurality (e.g. six) springs located about the shaft 2. The springs 15 provide relatively little force compared to the separating forces generated by the seal when in use, but are enough to move the sealing faces into contact under no pressure conditions. The spring 15 acts through L-shaped pusher sleeve 17 to urge the back face of the sealing element 14 axially towards the sealing ring 10.

The spring 15 acts against an inward radially flange of housing 19 of the seal 1.

A high pressure gas is supplied from the housing 19 to the radially outer edge of the sealing ring 10 and the sealing element 14. This gas is normally a clean gas suitable for venting into the atmosphere rather than the working fluid of the machine, in which case the leakage can be piped to burn (flare).

The high pressure extends across the sealing face of the sealing element 14 and around the back face thereof. Secondary seals are provided to prevent the high pressure venting around the sealing element 14.

A first secondary seal is formed by O-ring 20 between the pusher sleeve 17 and the inwardly extending radial flange of the housing 19. FIGS. 3*a* and 3*b* show alternative arrangements of the first secondary seal. FIG. 3*a* shows a first alternative where the first secondary seal is formed by an O-ring 20*a* and a back-up ring 20*b*. The back-up ring 20*b* can be made from e.g. Teflon, and is located on the low-pressure side of channel 21. FIG. 3*b* shows a second alternative where the first secondary seal is formed by a spring energised polymer seal 20'.

The O-ring 20 is located in a channel 21 formed in the axially extending leg of the L-shaped pusher sleeve 17. The O-ring seals against the axially extending face of the radial flange of the housing 19. The adjacent faces of the pusher sleeve 17 and the radial flange of the housing 19 extends substantially along a line at the equilibrium balance diameter for the shaft seal 1 when operating at its equilibrium separation made. As the pusher sleeve leg is radially inwards from the radial flange of the housing 19 the effect of frictional engagement of the O-ring will only cause the balance diameter to decrease because the frictional engagement is either on or inside the equilibrium balance diameter. Reducing the actual balance diameter increases closing force on the primary seal.

EXAMPLE

A shaft seal sealing a 115 mm diameter shaft pressured at 100 bar. The equilibrium balance diameter is set to 150.8 mm at which a closing force of 400 to 500 N is generated at the primary seal. The first secondary seal O-ring (20) has a sectional thickness of 3.5 mm (when new). If the frictional engagement between the O-ring (20) tended to increase the actual balance diameter during sliding movement with the O-ring (20), i.e. the prior art circumstance, the balance diameter could be increased to a maximum of 157.8 mm. At this balance diameter there is a net opening force on the primary seal of about 12000 N. This example assumes the case where the O-ring fails to move in the channel 21. Normally, the O-ring 20 would have moved under lower pressures, but still the net opening force could be higher than the closing force of the springs (which is typically in the region of 50 N).

This is illustrated in FIG.2, which shows a schematic pressure profile overlaid on the primary seal of the shaft seal 1. The distance between the sealing ring 10 and the sealing element 14 has been exaggerated for illustrative purposes. The block headed arrow 30 depicts the high pressure source on the outside diameter of the seal.

Line a represents the pressure profile generated with the seal 1 running at stable conditions. The highest pressure is generated at the radially-inward end of the grooves (shown in this case on sealing ring 10) illustrated as line d. As can be seen this pressure is greater than the high pressure shown at point f in stable running conditions, line a. The balance diameter is shown for this stable condition as line e, the equilibrium balance diameter.

Line b illustrates the present invention, showing the pressure profile during start-up of the machine. As the balance diameter is decreased the closing force illustrated by line b is higher than the stable-running pressure, line a, because the distance between the sealing ring 10 and the sealing element 14 is less. The seal is thus driven to its stable running conditions regardless of the frictional engagement of the O-ring 20.

Line c illustrates the prior art situation where the O-ring sticks and increases the balance diameter generated at start-up. Because the closing force never overcomes the opening force (H.P.) the seal is blown open and as will be appreciated, enough force is not generated to allow the primary seal to form.

In embodiments, not shown, where the high pressure extends radially inwards of the equilibrium balance diameter the equivalent O-ring of the first secondary seal can be located in a channel in the part radially outside the equilibrium balance diameter. In this case, the frictional engagement of the O-ring will tend to increase the actual balance diameter, which will again tend to increase the closing force generated at the primary seal.

A further secondary seal is also formed between the back face of sealing element 14 and the radially-extending leg of pusher sleeve 17. O-ring 24 is located in a channel 25 formed in the pusher sleeve 17, (but could be formed in the back face of the sealing element 14). The channel 25 is a half dove-tail channel. This shape of channel 25 prevents a pressure build up in the channel 25 which leads to the O-ring 24 being blown out of the channel 25 during rapid depressurisation of the machine or other transient conditions. This shape of channel 25 could be used advantageously in all shaft seals housings using a similarly placed secondary seal.

Of course, standard designs of channel (not shown) could be used for the further secondary seal, but this is not preferred.

The alternative sealing means shown in FIGS. 3a and 3b could also be employed in all other locations where O-rings are use in the illustrated embodiments. The spring energised teflon "U" type seal shown in FIG. 3b is often used because of its good behaviour during decompression.

As mentioned above, two shaft seals, of a type embodied by shaft seal 1, are used along a shaft 2 with the second seal acting as a back up to the first seal. One or more further seals could also be provided along the shaft if required.

What is claimed is:

1. A non-contact shaft seal comprising:

a seal housing;

a rotary sealing ring disposed in the seal housing;

a sealing element mounted coaxially to the rotary sealing ring to form a primary seal between opposed faces thereof for substantially preventing a fluid from flowing across the primary seal from a high-pressure radial side to a low-pressure radial side;

an L-shaped pusher sleeve slidably coupled to the seal housing, and having biasing means for urging the sealing element axially towards the rotary ring;

a sealing member disposed in a channel of the pusher sleeve and engaging the seal housing to form a secondary seal; and a second sealing member disposed between the sealing element and the pusher sleeve to form a tertiary seal.

2. The non-contact shaft seal of claim 1, wherein the second sealing member is disposed in a half dove-tail channel formed in the pusher sleeve.

3. A non-contact shaft seal comprising:

a seal housing;

a rotary sealing ring disposed in the seal housing;

a sealing element mounted coaxially to the rotary sealing ring to form a primary seal between opposed faces thereof for substantially preventing a fluid from flowing across the primary seal from a high-pressure radial side to a low-pressure radial side;

an L-shaped pusher sleeve slidably coupled to the seal housing, and having biasing means for urging the sealing element axially towards the rotary ring;

a sealing member disposed in a channel of the pusher sleeve and engaging the seal housing to form a secondary seal; and a second sealing member disposed between the sealing element and the pusher sleeve to form a tertiary seal, wherein the second sealing member is disposed in a half dove-tail channel formed in the pusher sleeve.

* * * * *